US009434109B2

(12) United States Patent
Ding

(10) Patent No.: US 9,434,109 B2
(45) Date of Patent: Sep. 6, 2016

(54) THREE-DIMENSIONAL PRINTING METHOD

(71) Applicants: XYZprinting, Inc., New Taipei (TW) Kinpo Electronics, Inc., New Taipei (TW); Cal-Comp Electronics & Communications Company Limited, New Taipei (TW)

(72) Inventor: Ming-Hsiung Ding, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 338 days.

(21) Appl. No.: 14/156,474

(22) Filed: Jan. 16, 2014

(65) Prior Publication Data

US 2015/0137423 A1 May 21, 2015

(30) Foreign Application Priority Data

Nov. 18, 2013 (TW) .............................. 102141933 A

(51) Int. Cl.
| | | |
|---|---|---|
| *B29C 33/58* | (2006.01) | |
| *B29C 33/60* | (2006.01) | |
| *B29C 41/02* | (2006.01) | |
| *B29C 41/38* | (2006.01) | |
| *B29C 67/00* | (2006.01) | |
| *B29C 33/30* | (2006.01) | |
| *B33Y 10/00* | (2015.01) | |
| *B33Y 50/00* | (2015.01) | |

(52) U.S. Cl.
CPC ......... *B29C 67/0092* (2013.01); *B29C 33/306* (2013.01); *B29C 67/0055* (2013.01); *B29C 67/0059* (2013.01); *B29C 67/0081* (2013.01); *B33Y 10/00* (2014.12); *B33Y 50/00* (2014.12)

(58) Field of Classification Search
CPC ..... B29C 33/306; B29C 33/56; B29C 33/58; B29C 33/60; B29C 41/02; B29C 41/38; B29C 67/0055; B29C 67/0059; B29C 67/0081; B29C 67/0092; G06F 19/00
USPC ................. 264/39, 308, 313, 317, 401, 497; 700/119
See application file for complete search history.

(56) References Cited

U.S. PATENT DOCUMENTS

| 5,503,785 | A | * | 4/1996 | Crump | ................ | B29C 67/0092 264/308 |
| 2002/0171177 | A1 | * | 11/2002 | Kritchman | .......... | B29C 67/0059 264/401 |
| 2014/0333011 | A1 | * | 11/2014 | Javidan | ............... | B29C 67/0055 264/401 |

FOREIGN PATENT DOCUMENTS

| JP | H05301293 | 11/1993 |
| JP | H05305672 | 11/1993 |

(Continued)

OTHER PUBLICATIONS

"Office Action of Japanese Counterpart Application", issued on May 18, 2015, p. 1-p. 3, in which the listed references were cited.

(Continued)

*Primary Examiner* — Leo B Tentoni
(74) *Attorney, Agent, or Firm* — Jianq Chyun IP Office

(57) ABSTRACT

A three-dimensional printing method for forming a three-dimensional object on a base is provided. The method comprises providing a model library comprising at least one supporting member, selecting the at least one supporting member from the model library and disposing the at least one supporting member onto the base. The three-dimensional object is printed over the base and the at least one supporting member, and the three-dimensional object has an overhanging portion relative to the base and the at least one supporting member is filled between the overhanging portion and the base.

11 Claims, 6 Drawing Sheets

(56) References Cited

FOREIGN PATENT DOCUMENTS

| JP | H07223267  | 8/1995  |
|----|------------|---------|
| JP | 2005297573 | 10/2005 |
| JP | 2010538882 | 12/2010 |
| TW | 200951093  | 12/2009 |

OTHER PUBLICATIONS

"Office Action of Taiwan Counterpart Application", issued on Jan. 20, 2015, p. 1-p. 5, in which the listed references were cited.

* cited by examiner

THREE-DIMENSIONAL PRINTING METHOD

CROSS-REFERENCE TO RELATED APPLICATION

This application claims the priority benefit of Taiwan application serial no. 102141933, filed on Nov. 18, 2013. The entirety of the above-mentioned patent application is hereby incorporated by reference herein and made a part of this specification.

BACKGROUND OF THE INVENTION

1. Field of the Invention

The present invention relates to a three-dimensional printing method.

2. Description of Related Art

Following the development of technology, various approaches have been proposed to establish physically three-dimensional (3-D) models by using additive manufacturing technology such as layer-by-layer model construction. Generally, additive manufacturing technology transforms the design information of 3-D models built by the modeling software or computer-aided design (CAD) into multiple thin (quasi two-dimensional) cross-section layers to be successively stacked.

Currently, a number of methods have been developed to form multiple thin cross-section layers. For example, printer head usually moves along X-Y coordinate above the base according to X-Y-Z coordinate from the design information of 3-D models, and then it sprays the build material in the correct shape of cross-section layers. Afterwards, the deposited material is naturally harden or solidified by a strong light source to become the desirable cross-section layers and to form the three-dimensional object through layer-by-layer solidification. Depending on the property of the build material, different methods may be used to form the 3-D models. For example, some methods, such as selective laser sintering (SLS) and fused deposition modeling (FDM), melt or soften the plastic material as the "ink" for printing to produce the layers. Besides, other methods, such as stereolithography (SLA) and laminated object manufacturing (LOM), use liquid materials as the "ink" for printing. The printer reads the cross-section information from the files and prints out these cross-sections layer-by-layer with liquid, powder or sheet form materials to build the model by adhering a series of cross-section layers together. Such technology is known for possibly forming the objects in any shape.

No matter whichever forming method is used to perform three-dimensional printing, it is necessary to concurrently print out supporting structures between the overhanging portion and the base for the existing three-dimensional printing processes, if the expected three-dimensional object has the overhanging portion, namely, there is space existing between the overhanging portion and the base. The supporting structure aims to avoid stress concentrated at the overhanging portion of three-dimensional object, thus leading to deformation. After completing the three-dimensional printing process, the aforementioned supporting structure will be removed from the three-dimensional object.

As the aforementioned supporting structure is merely used to support the three-dimensional object and has to be removed later, the supporting structure can not be reused and will be wasted. The more overhanging portions the three-dimensional object has, the more supporting structures are needed. As a result, more materials are wasted, longer time is need to build the model and the efficiency of three-dimensional printing is lowered.

SUMMARY OF THE INVENTION

The exemplary embodiment provides a three-dimensional printing method, with effects of saving cost and reducing manufacture process time.

The exemplary embodiment provides a three-dimensional printing method for forming a three-dimensional object on a base. A model library comprising at least one supporting member is provided. At least one supporting member is selected from the model library and disposed onto the base. The three-dimensional object is printed over the base and the supporting member. The three-dimensional object has at least one overhanging portion relative to the base and the at least one supporting member is filled between the at least one overhanging portion and the base.

In one exemplary embodiment, the three-dimensional printing method further comprises developing an iconic model of the three-dimensional object, and calculating a height of an overhanging portion of the iconic model relative to the base. Afterwards, a supporting member having a height less than or equal to a height of the overhanging portion relative to the base is searched from the model library.

In one exemplary embodiment, the three-dimensional printing method further comprises calculating an orthogonal projection contour of the overhanging portion onto the base. The supporting member having an orthogonal projection contour onto the base approaching or matching with an orthogonal projection contour of the overhanging portion onto the base is selected from the model library. In addition, an orthogonal projection area of the supporting member onto the base is smaller than or equal to an orthogonal projection area of the overhanging portion onto the base.

In one exemplary embodiment, the three-dimensional printing method further comprises selecting a plurality of supporting members from the model library, and an orthogonal projection contour of the plurality of supporting members onto the base approaches or matches with the orthogonal projection contour of the overhanging portion onto the base. In addition, an orthogonal projection area of the plurality of supporting members onto the base is smaller than or equal to the orthogonal projection area of the overhanging portion onto the base.

In one exemplary embodiment, the at least one supporting member is a pillar.

In one exemplary embodiment, a material of the at least one supporting member is the same as that of the three-dimensional object.

In one exemplary embodiment, a height of the at least one overhanging portion relative to the base is larger than a height of the at least one supporting member. The three-dimensional printing method further comprises, printing the at least one overhanging portion and a wastage portion over the at least one supporting member, wherein the wastage portion is removably connected to the at least one overhanging portion and the at least one supporting member.

In one exemplary embodiment the three-dimensional printing method further comprises, printing a dismantling structure between the at least one supporting member and the wastage portion. In addition, the wastage portion and the at least one supporting member are separated through dismantling structure.

In one exemplary embodiment, the dismantling structure is a three-dimensional structure of line-up perforation pores.

In one exemplary embodiment, the three-dimensional printing method further comprises, recycling the at least one supporting member to the model library.

In the aforementioned exemplary embodiments, the supporting structures required in three-dimensional printing process are all searched from the model library comprising supporting members of different scales and types. Therefore, material waste is reduced, manufacture process time is saved, and manufacture process efficiency is enhanced. At the same time, the three-dimensional object of the three-dimensional printing also reduces complexity of subsequent manufacture process, and environment pollution is also reduced.

The concepts and advantages of the present invention will become more apparent in view of the following embodiments, with drawings and accompanying detailed information.

DESCRIPTION OF EMBODIMENTS

Figure 1:
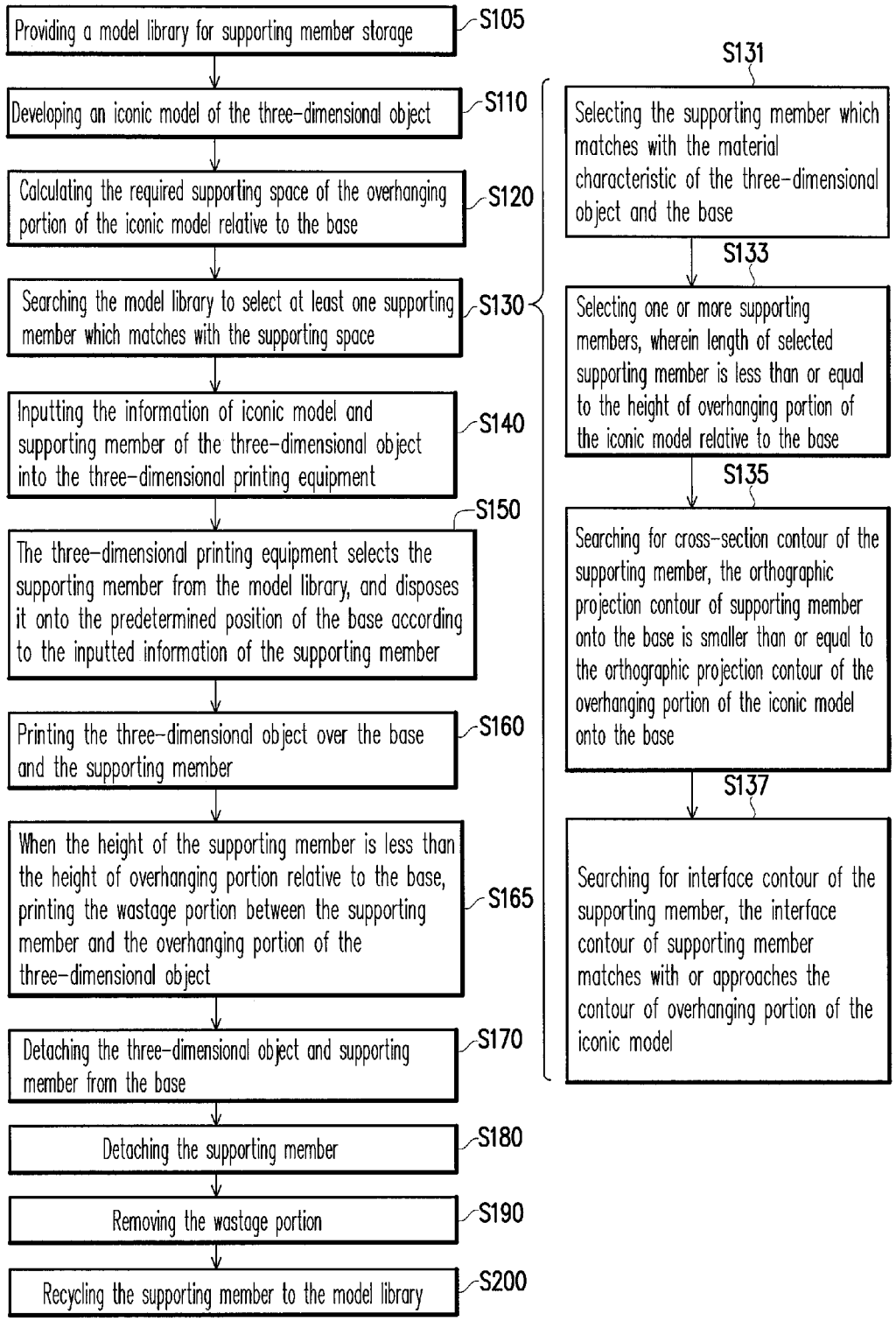
FIG. 1 is a flow chart of the three-dimensional printing method of the exemplary embodiment.
Figure 2:
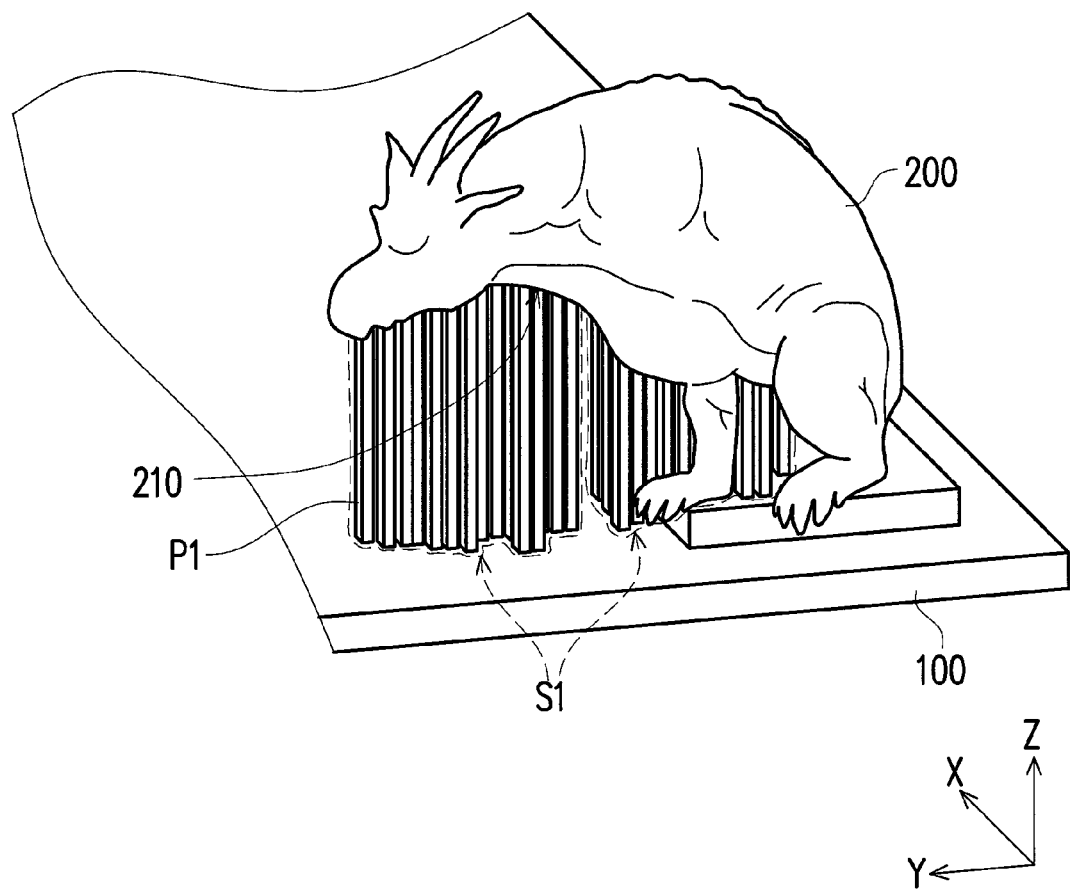
FIG. 2 is a schematic display of a three-dimensional object formed by the three-dimensional printing method of FIG. 1.

FIG. 1 is a flow chart illustrating the steps of a three-dimensional printing method of the exemplary embodiment. FIG. 2 is a schematic display of a three-dimensional object formed by the three-dimensional printing method of FIG. 1. Referring to FIGS. 1 and 2 at the same time, in the present embodiment, the three-dimensional object 200 is formed on a base 100 according to the three-dimensional printing method. In addition, it can be accomplished by any existing three-dimensional printing methods, such as fused deposition modeling (FDM) and stereolithography (SLA). However, as shown in FIG. 2, if the three-dimensional object 200 has an overhanging portion 210, no matter whichever three-dimensional printing method is used, it is necessary to provide enough supporting structures at the overhanging portion 210. The supporting structure aims to avoid deformation caused by lack of supporting structure and stress concentrated at the overhanging portion 210 after the formation of the three-dimensional object 200. Specifically, the overhanging portion 210 described in the present application means a portion of the three-dimensional object 200 which does not contact the base 100 directly.

In other words, in the process of forming three-dimensional object 200 by the three-dimensional printing method, it is necessary to concurrently print out structures supporting the overhanging portion 210 of the three-dimensional object 200. Afterwards, these supporting structures are removed from the three-dimensional object 200 to obtain the expected three-dimensional object 200. Hence, if an area of the overhanging portion 210 of the three-dimensional object 200 is larger or wider, the concurrently printed-out supporting structures also increase, which leads to material waste and longer process time and increased production cost.

Therefore, the method proposed in the exemplary embodiment is able to improve the aforementioned issues. Referring to FIG. 1 again, in step S105 of the present embodiment, a model library is provided first, and pillar-like supporting members of different sizes are collected and stored in the model library. The supporting members in the model library comprise newly-developed supporting members or recycled supporting members after forming the previous three-dimensional object. There is no restriction on model library establishment methods, and the type and amount of the supporting members in the model library are gradually expanded with time and frequency.

In step S110, an operator has to develop an iconic model of the three-dimensional object using the computer-aided design (CAD) or computer animation modeling software. Later, the developed three-dimensional iconic model is "divided" into layer-by-layer cross-sections, in order to instruct a three-dimensional printing equipment (not shown) to perform layer-by-layer printing over the base 100 in subsequent steps. Besides, the aforementioned model library synchronizes with computer-aided design (CAD) or computer animation modeling software.

FIG. 2 is used as an example to concurrently describe the three-dimensional object 200 and its iconic model. After the iconic model is developed, step S120 is performed to calculate the supporting space S1 required by the overhanging portion 210 of the iconic model relative to the base 100, namely, the space defined by the local overhang of the three dimensional object 200 above the base 100. In step S130, at least one supporting member P1 suitable for the supporting space is selected from the model library through searching the model library. The at least one supporting member P1 is suitable for the supporting space and serves as a demountable supporting structure of the three-dimensional object 200. The number of the selected supporting member P1 is not limited and may be selected based on the best fitting conditions for one or more supporting members P1 according to the requirements. Hereinafter a plurality of supporting members P1 is used as an example for descriptions.

Furthermore, step S130 includes a plurality of searching queries with different conditions, based on the material characteristic of the three-dimensional object 200 and the sizes of the supporting space S1 for selecting the supporting member P1. In step S131, the supporting member P1 which fits the material characteristics of the three-dimensional object 200 and the base 100 is selected. In the present embodiment, the materials of the supporting member P1 and the three-dimensional object 200 are the same, and it is beneficial for the binding of the overhanging portion 210 and the supporting member P1 when forming the three-dimensional object 200. Alternatively, the supporting member may be formed with materials having good binding ability and easy dismantling capability from the three-dimensional object.

After the material of the supporting member P1 is confirmed, the supporting member P1 which fits the supporting space S1 is searched. In step S133, one or more supporting members P1 are selected and the length of each supporting member P1 is less than or equal to a height of the overhanging portion 210 of the iconic model relative to the base 100 (which is equal to a height of the supporting space S1 relative to the base 100 demonstrated in FIG. 2). Afterwards, in step S135, a cross section contour of the supporting member P1 is searched. Among one or more supporting member P1 searched from the model library, the orthogonal projection contour or a collection of the orthogonal projection contour of the supporting members P1 onto the base 100 is smaller than or equal to an orthogonal projection contour of the overhanging portion 210 of the iconic model onto the base 100. Besides, in step S137, an interface contour of the supporting member P1 is searched. Therefore, among one or more supporting members P1 searched from the model library, the interface contour or a collection of the interface contour of supporting members P1 approaches or matches with the contour of the overhanging portion 210 of the iconic model. Hereby, the interface means the contacting surface of the supporting member P1 and the overhanging portion 210. By the way, there is no restriction on the sequence from Step S131 to S137.

The aforementioned steps S105 to S137 are all related queries of computer-aided design (CAD) or computer animation modeling software, so that users can select the suitable supporting member P1 or the collection thereof from the existing model library when developing the iconic model of the three-dimensional object 200. Afterwards, in the subsequent step S140, the related information of the aforementioned iconic model comprising the required supporting member(s) is inputted into the three-dimensional printing equipment. Afterwards, in S150 and S160, the three-dimensional printing equipment picks up the searched supporting member P1 from the model library and disposes it onto a predetermined position of the base 100 according to inputted related information, in order to three-dimensionally print out the three-dimensional object 200 on the base 100 and over the supporting member P1. Hence, it is unnecessary to form the entire supporting member(s) P1 in the three-dimensional printing manufacture process. Therefore, the exemplary embodiment can save time and efficiently lower costs for three-dimensional printing. Also, by using the demountable supporting member(s), the printing materials can be saved.

On the other hand, in the present embodiment, the shape or contour of the three-dimensional object 200 may vary in the three-dimensional printing process. Namely, the position, the contour and the size of the overhanging portion 210 are not fixed. Hence, it may not be possible to search for the supporting member P1 matching all or most of the conditions from the model library based on the aforementioned step S133 to S137. Herein, the conditions may refer to the length of the supporting member P1 being equal to the height of the overhanging portion 210 of the iconic model relative to the base 100, the orthogonal projection contour of the supporting member P1 onto the base 100 being equal to the orthogonal projection contour onto of overhanging portion 210 of the iconic model onto the base 100, and the interface contour of supporting member P1 matching with the contour of the overhanging portion 210 of the iconic model, as mentioned above. The subsequent embodiments are provided to explain the model library searching method when a part of the aforementioned conditions is not satisfied.

Figure 3:
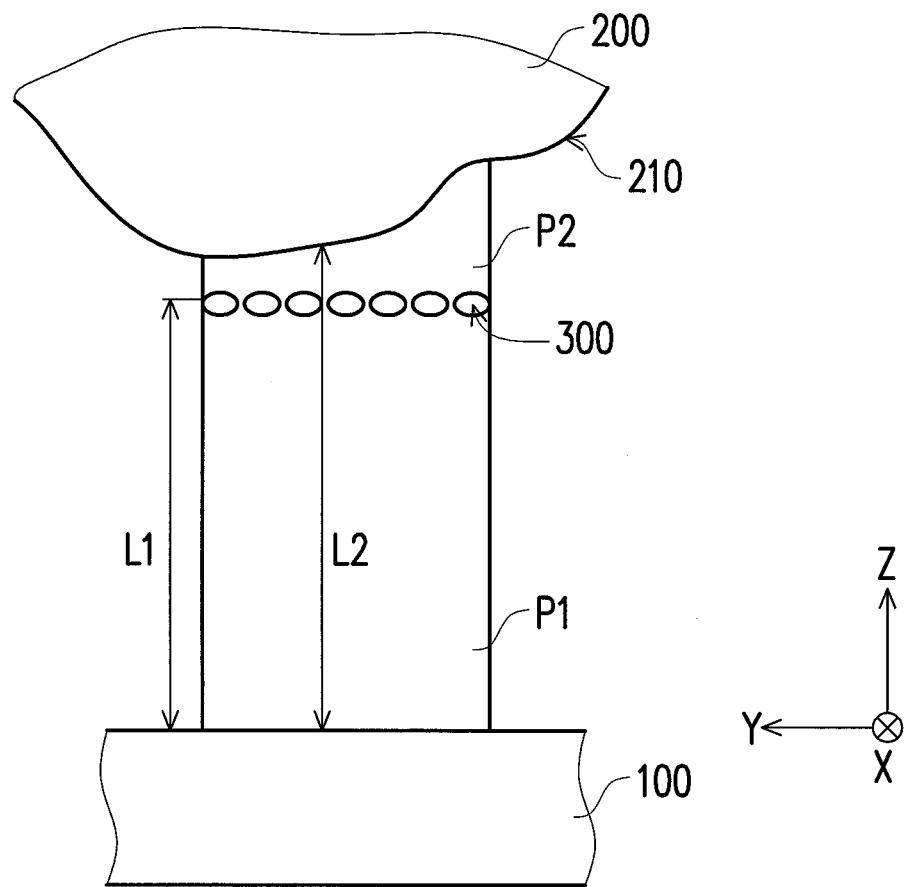
FIG. 3 is a schematic enlarged view showing a portion of the structure of FIG. 2.

FIG. 3 is a schematic enlarged view showing a portion of the structure of FIG. 2. Referring to FIGS. 1-3 at the same time, as for the length of the supporting member P1, the contour of the overhanging portion 210 is not regular, so the height L2 relative to base 100 changes with positions on X-Y plane. Therefore, in step S133, when there is no supporting member in the model library which completely fits the interface contour and the height of the overhanging portion 210, the supporting member P1 with length smaller than but close to L2 condition will be searched to be the better fitting condition. As demonstrated in FIG. 3, the supporting member P1 of a height L1 has been selected in the present embodiment to be an object which is closest to the overhanging portion 210 with a height L2 in the model library. Afterwards, in step S160, the three-dimensional printing equipment is able to form a wastage portion P2 and the three-dimensional object 200 over a base of the supporting member P1, wherein the wastage portion P2 is filled between the supporting member P1 and the overhanging portion 210, and a volume of the wastage portion P2 is smaller than a volume of the suspension member P1. In other words, in the three-dimensional printing process, it is only necessary to form the wastage portion P2 with smaller volume over the base of the supporting member P1, and then the three-dimensional object 200 will be formed. Namely, it is unnecessary to form complete supporting structure (the supporting member P1 and the wastage portion P2) again from the base 100, so the material amount and manufacture process time of the three-dimensional object 200 forming decrease.

It is noted that, in the present embodiment, a dismantling structure 300 is formed between the supporting member P1 and the wastage portion P2 in the three-dimensional printing process. For example, a three-dimensional structure of line-up perforation pores demonstrated in FIG. 3. After completing the three-dimensional printing, the three-dimensional object 200, the supporting member P1 and the wastage portion P2 formed are dismantled from the base 100 in step S170. Afterwards, in step S180, the supporting member P1 is dismantled from the three-dimensional object 200 and the wastage portion P2 through the dismantling structure 300. Afterwards, in step S190, the wastage portion P2 can be dismantled from the three-dimensional object 200 through processing. There is no restriction on the dismantling method of the wastage portion P2, and physical method (such as milling) or chemical method (such as dissolution) can be used to dismantle the wastage portion P2. Ultimately, in step S200, the dismantled supporting member P1 is recycled to the model library, for next manufacture process.

Figure 4:
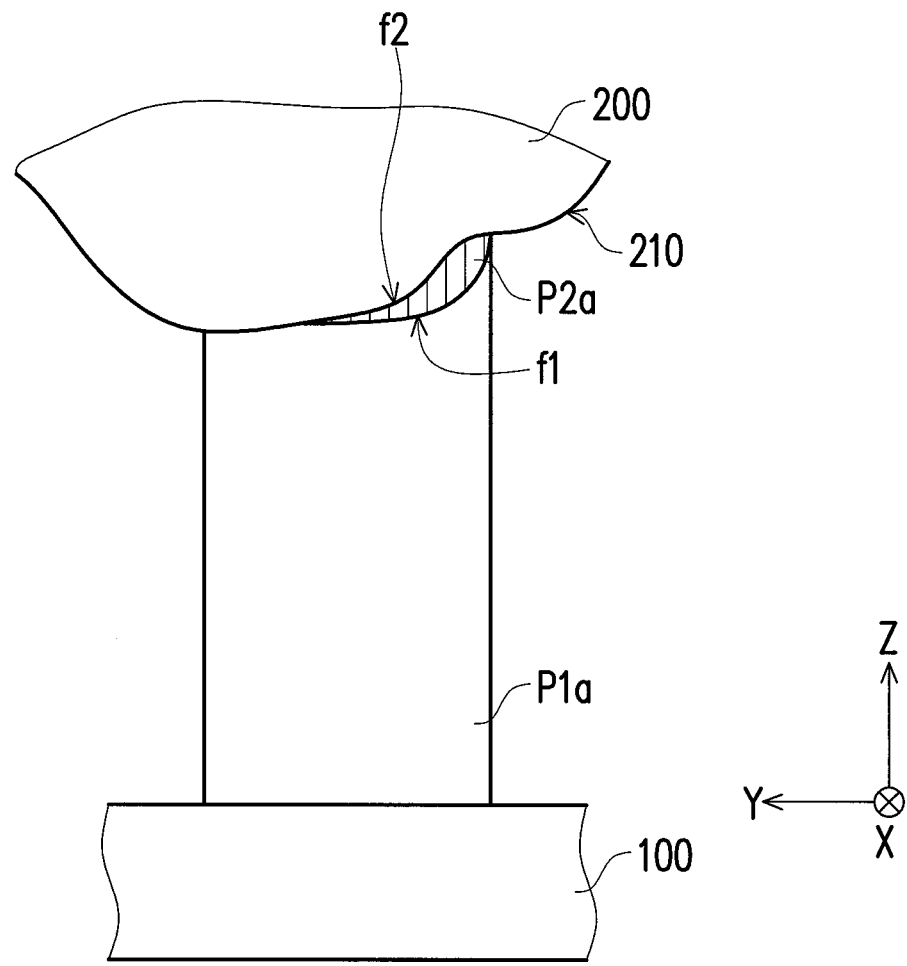
FIG. 4 is a schematic enlarged view showing a portion of the three-dimensional object formed by the three-dimensional printing method according to another exemplary embodiment.

FIG. 4 is a schematic enlarged view showing a portion of the three-dimensional object formed by the three-dimensional printing method according to another exemplary embodiment. Referring to FIG. 4, in the present embodiment, in step S137, there is no supporting member in the model library which completely fits contour f2 of overhanging portion 210. Therefore, current searching condition should use supporting member P1a as the object, wherein the contour of interface f1 is close to contour f2, but the height is lower than contour f2. Hence, as demonstrated in FIG. 4, as for the searched P1a, the interface f1 certainly fits the aforementioned requirements. As a result, in step S160 and S165, three-dimensional printing equipment forms three-dimensional object 200 over base 100 and supporting member P1a. At the same time, wastage portion P2a (hatched line drawing) is formed between supporting member P1a and overhanging portion 210. This also achieves the effect of material usage amount lowering and manufacture process ability enhancement. Besides, the same as aforementioned, the dismantling structure is also formed between supporting member P1a and supplied portion P2a in the present embodiment (refer to the embodiment of FIG. 3), and it is unnecessary to go into details here.

Figure 5:
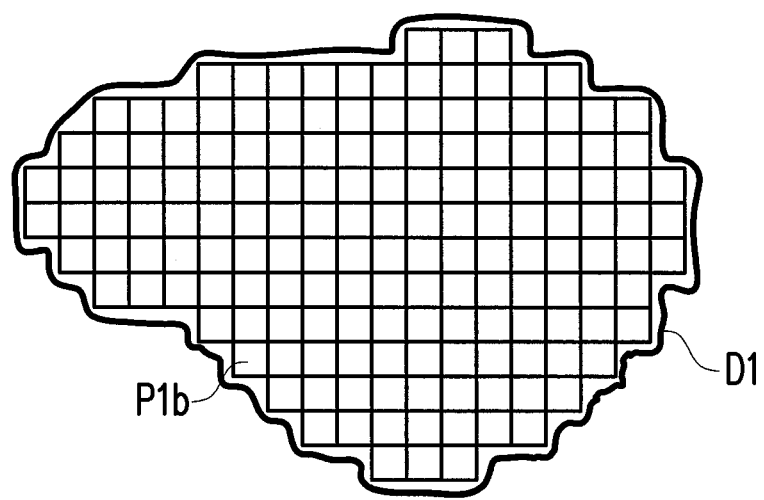
FIG. 5 shows the orthogonal projection of three-dimensional object and supporting member of FIG. 2 onto the base.

FIG. 5 is the orthogonal projection of the three-dimensional object and the supporting member of FIG. 2 onto the base. Referring to FIGS. 1, 2 and 5 at the same time to illustrate step S135. As aforementioned, the overhanging portion 210 of the three-dimensional object 200 is not a fixed contour. Hence, when only one supporting member or there is no supporting member in the model library which completely fits an orthogonal projection D1 of overhanging portion 210 onto the base 100, a plurality of supporting members P1 are required to form a collection which approaches the aforementioned orthogonal projection contour D1, to be searching conditions. Therefore, in the present embodiment, the plurality of supporting members P1 are searched in step S135, and the assembly formed by its orthogonal projection P1a onto the base 100 approaches the orthogonal projection contour D1 of the overhanging portion 210. In addition, an orthogonal projection area of the plurality of supporting members P1 onto the base 100 is less than or equal to an orthogonal projection area of the overhanging portion 210 onto the base 100 (which is an area comprised by the orthogonal projection contour D1). Therefore, the plurality of supporting members P1 is used to support the overhanging portion 210.

Figure 6:
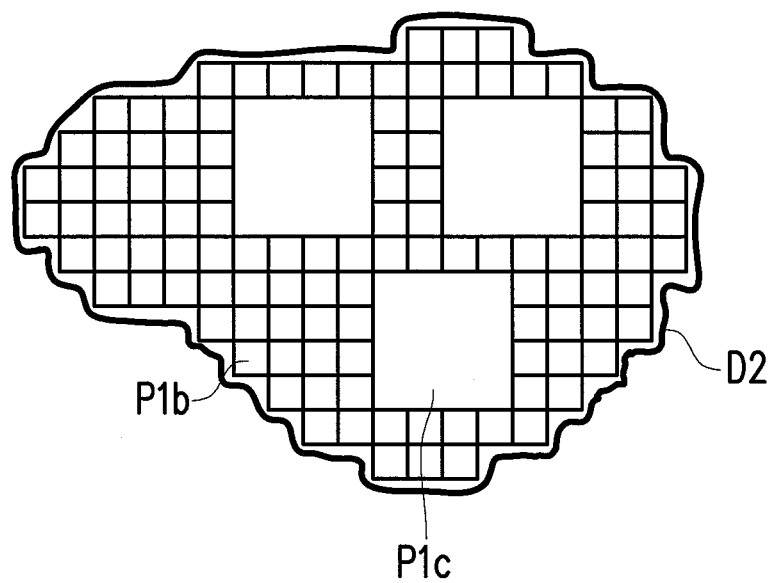
FIG. 6 is an orthogonal projection of a three-dimensional object and a supporting member onto the base according to another exemplary embodiment.

However, the aforementioned contour approaching method is not limited in the present invention. FIG. 6 is the orthogonal projection of the three-dimensional object and supporting member onto the base of another exemplary embodiment. Referring to FIG. 6, in the present embodiment, different supporting members can also be selected, and orthogonal projection contours of these supporting members onto the base 100 comprises P1b and P1c also achieve the purpose of an orthogonal projection contour D2 approaching, and the effects of reducing supporting member using time and amount. In other words, depending on the actual requirements, a plurality of different permutations and combinations can be used as the searching condition of the supporting member in the exemplary embodiment, to select the supporting member which fits the requirements.

To sum up, in the aforementioned embodiments, the supporting structures required in the three-dimensional printing process can all be searched and obtained from the model library through the model library comprising a plurality of supporting members in different scales and types. Therefore, material waste can be reduced, manufacture process time can be shortened, and manufacture process efficiency can be enhanced. At the same time, as for the three-dimensional object after the completion of the three-dimensional printing, the complexity of subsequent manufacture process can be reduced, and environment pollution can also be reduced.

Furthermore, in the process of searching supporting member from the model library, the searching condition changes with the contour of the overhanging portion, the dimensions and sizes of the underneath supporting space, and the type and amount of the existing supporting members in the model library. When there is no supporting member in the model library which completely fits the supporting space and the contour of the overhanging portion, a collection formed by a plurality of supporting members is needed to match the required dimensions and sizes. Hence, during the three-dimensional printing, it is only necessary to form small proportion of the wastage portion on the searched supporting member, and then the three-dimensional object printing can be performed, and the above effects can also be achieved.

Besides, the dismantling structure is three-dimensionally printed concurrently between the supporting member and the wastage portion, which promotes the supporting member dismantling process from the three-dimensional object (and the wastage portion) after the three-dimensional printing, and the recycle of supporting member to model library.

It will be apparent to those skilled in the art that various modifications and variations can be made to the structure of the exemplary embodiment without departing from the scope or spirit of the invention. In view of the foregoing, it is intended that the exemplary embodiment cover modifications and variations of this invention provided they fall within the scope of the following claims and their equivalents.

What is claimed is:

1. A three-dimensional printing method for forming a three-dimensional object on a base, and the three-dimensional printing method comprising:
   providing a model library and the model library comprises at least one supporting member;
   developing an iconic model of the three-dimensional object, wherein the three-dimensional object has at least one overhanging portion relative to the base;
   calculating a required supporting space of the overhanging portion of the iconic model relative to the base;
   searching for a supporting member from the at least one supporting member in the model library according to a result of calculating the required supporting space;
   selecting the at least one supporting member and disposing the at least one supporting member onto the base; and
   printing the three-dimensional object over the base and the at least one supporting member, wherein the at least one supporting member is filled between the at least one overhanging portion and the base.

2. The three-dimensional printing method according to claim 1,
   wherein the required supporting space is a height of the overhanging portion of the iconic model relative to the base
   and a height of the supporting member is less than or equal to a height of the overhanging portion of the iconic model relative to the base.

3. The three-dimensional printing method according to claim 2, further comprising:
   calculating an orthogonal projection contour of the overhanging portion of the iconic model onto the base; and
   selecting the supporting member from the at least one supporting member in the model library, wherein an orthogonal projection contour of the supporting member onto the base approaches or matches with an orthogonal projection contour of the overhanging portion onto the base, and an orthogonal projection area of the supporting member onto the base is smaller than or equal to an orthogonal projection area of the overhanging portion onto the base.

4. The three-dimensional printing method according to claim 3, the model library comprising a plurality of supporting members, and the three-dimensional printing method further comprising:
   selecting a plurality of supporting members from the model library, wherein an orthogonal projection contour of the plurality of supporting members onto the base approaches or matches with the orthogonal projection contour of the overhanging portion onto the base, and an orthogonal projection area of the plurality of supporting members onto the base is smaller than or equal to the orthogonal projection area of the overhanging portion onto the base.

5. The three-dimensional printing method according to claim 1, wherein the at least one supporting member is a pillar.

6. The three-dimensional printing method according to claim 1, wherein a material of the at least one supporting member is the same as that of the three-dimensional object.

7. The three-dimensional printing method according to claim 1, wherein a height of the at least one overhanging portion relative to the base is larger than a height of the at least one supporting member and the three-dimensional printing method further comprises:

printing the at least one overhanging portion and a wastage portion over the at least one supporting member, and the wastage portion is removably connected to the at least one overhanging portion and the at least one supporting member.

8. The three-dimensional printing method according to claim 7, further comprising:

printing a dismantling structure between the at least one supporting member and the wastage portion; and separating the wastage portion and the at least one supporting member through the dismantling structure.

9. The three-dimensional printing method according to claim 8, wherein the dismantling structure is a three-dimensional structure of line-up perforation pores.

10. The three-dimensional printing method according to claim 7, wherein a volume of the wastage portion is smaller than a volume of the at least one supporting member.

11. The three-dimensional printing method according to claim 1, further comprising:

recycling the at least one supporting member to the model library.

* * * * *